(12) United States Patent
Kurtz et al.

(10) Patent No.: US 7,779,682 B2
(45) Date of Patent: Aug. 24, 2010

(54) DUAL PURPOSE PRESSURE SENSOR

(75) Inventors: Anthony D. Kurtz, Saddle River, NJ (US); Robert Gardner, Westwood, NJ (US); Richard Martin, Ridgewood, NJ (US); Leo Geras, Ridgefield, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 96 days.

(21) Appl. No.: 12/074,314

(22) Filed: Oct. 6, 2008

(65) Prior Publication Data

US 2010/0083767 A1    Apr. 8, 2010

(51) Int. Cl.
    *B60C 23/02* (2006.01)
(52) U.S. Cl. ..................................... 73/146.8
(58) Field of Classification Search .................. None
    See application file for complete search history.

(56) References Cited

U.S. PATENT DOCUMENTS

| | | | |
|---|---|---|---|
| 4,406,993 A | 9/1983 | Kurtz | |
| 4,814,845 A | 3/1989 | Kurtz | |
| 5,055,826 A * | 10/1991 | Ballyns | 340/442 |
| 5,119,066 A * | 6/1992 | Ballyns | 340/442 |
| 6,401,743 B1 * | 6/2002 | Naedler | 137/224 |
| 6,715,355 B2 * | 4/2004 | Vile et al. | 73/702 |
| 6,854,335 B1 | 2/2005 | Burns | |
| 7,283,922 B2 | 10/2007 | Kurtz | |
| 7,377,156 B1 * | 5/2008 | Mattson et al. | 73/146 |
| 2002/0117005 A1 | 8/2002 | Vile et al. | |
| 2006/0173648 A1 | 8/2006 | Chang | |
| 2010/0031741 A1 * | 2/2010 | Achterholt | 73/146.3 |

FOREIGN PATENT DOCUMENTS

| | | |
|---|---|---|
| JP | 2005156569 | 6/2005 |
| KR | 20-0383746 | 5/2005 |
| WO | 95-10425 | 4/1995 |

OTHER PUBLICATIONS

International Search Report and Written Opinion dated May 10, 2010 issued by the Korean Intellectual Property Office for PCT Application No. PCT/US2009/059727.

* cited by examiner

*Primary Examiner*—Andre J Allen
(74) *Attorney, Agent, or Firm*—James E. Schutz, Esq.; Troutman Sanders LLP

(57) ABSTRACT

A pressure transducer, particularly adapted to measure the pressure in a tire and to enable the tire to be filled includes a first housing, having an internal hollow. Positioned in the hollow of the first housing is a second housing, also having an internal hollow. The second housing is supported within the first housing so that a passageway for airflow exists between the housings. The second housing has a pressure port for monitoring the pressure of a tire. The first housing has an inlet port for receiving a source of pressure. The inlet port contains a valve which is selectively operated. The valve, when operated, permits air to flow into the hollow of the first housing and to flow about the periphery of the second housing to enter the pressure port associated with the second housing. The pressure port may, as indicated, be associated with a tire and the second housing contains a pressure sensing device which monitors the pressure in the tire via the pressure port. In this manner, the pressure in the tire can be monitored while additional air can be added through the valve which air flows around the second housing to enter the tire or other device coupled to the pressure transducer.

15 Claims, 3 Drawing Sheets

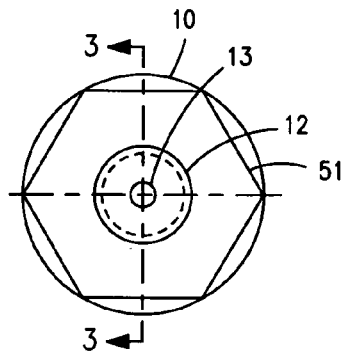
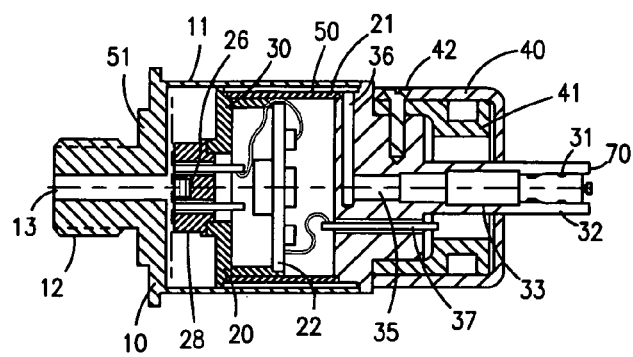
FIG. 2    FIG. 3
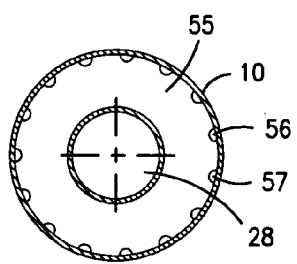
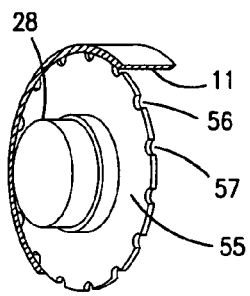
FIG. 4    FIG. 5
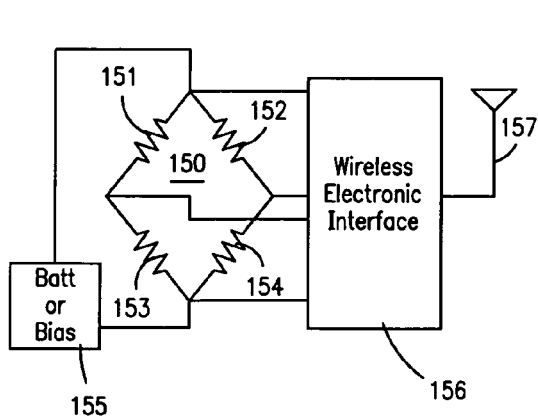
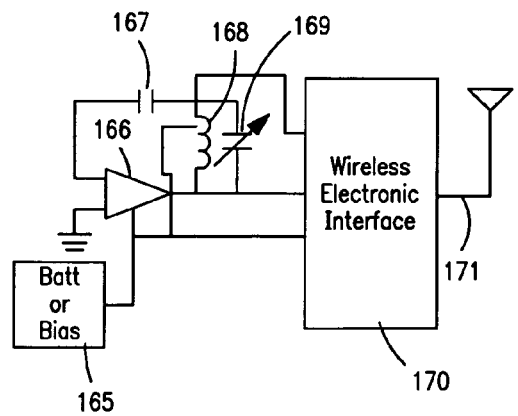
FIG. 6    FIG. 7

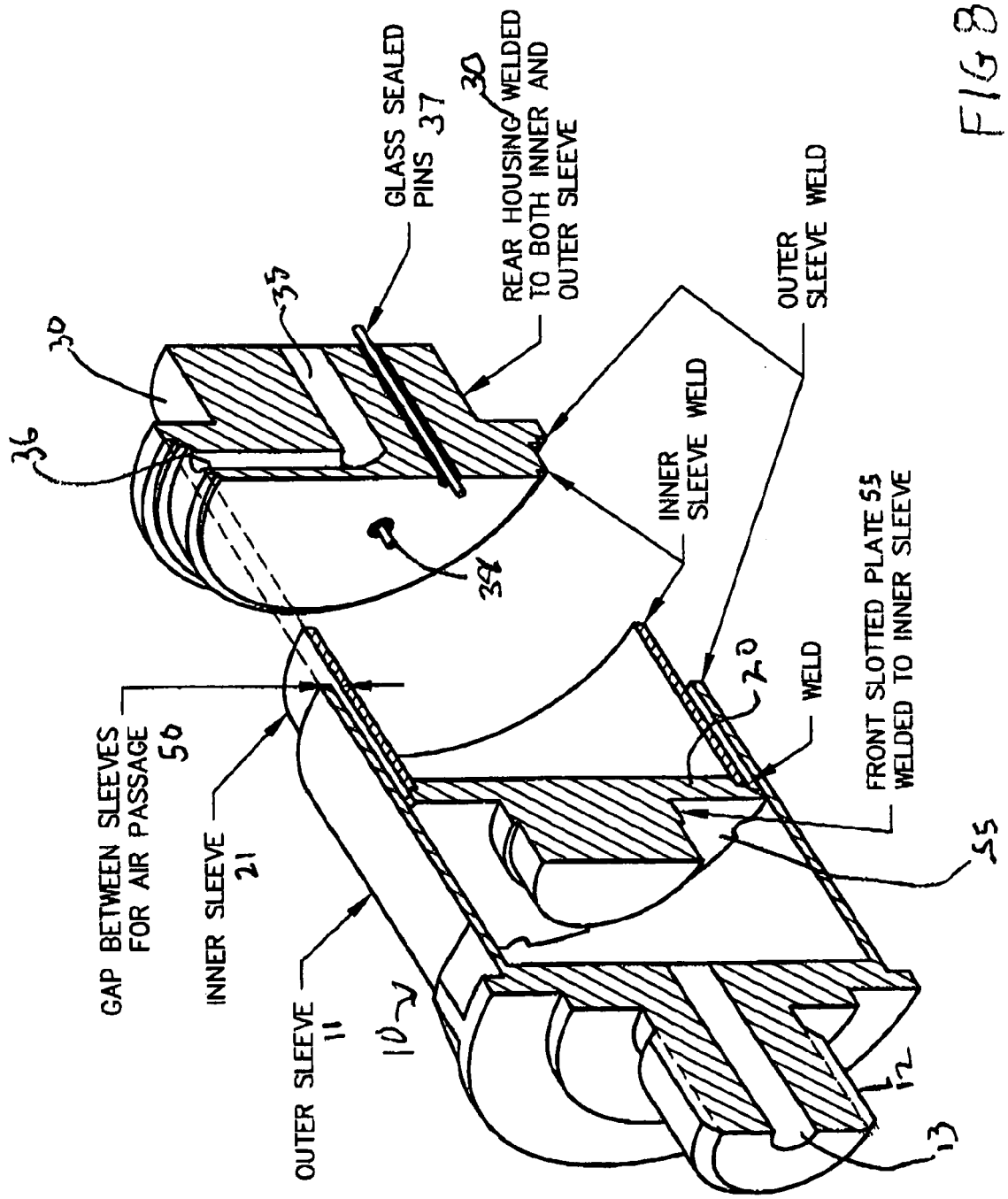

DUAL PURPOSE PRESSURE SENSOR

FIELD OF THE INVENTION

This invention relates to pressure transducers and, more particularly to a pressure transducer having a dual purpose as for measuring the pressure in an inflatable device, as a tire, while permitting additional pressure medium to be added as desired.

BACKGROUND OF THE INVENTION

Pressure measurements are employed in many applications. In order to measure pressure a conventional device is called a pressure transducer or pressure sensor. Such devices are well known and many of such devices are constructed utilizing semiconductor techniques. These devices conventionally utilize piezoresistors which are formed on a semiconductor diaphragm and which varies resistance proportional to a force or pressure applied to the diaphragm. Other devices can use tuned circuits such as inductor capacitor circuits where the capacitance which also can be formed from semiconductor techniques varies according to a pressure or force applied to the associated diaphragm. In one particular application the pressure transducers can be used to measure pressure in tires such as aircraft or automobile tires or in similar articles. In any event, in view of the above, there is a need for highly accurate pressure transducer which will measure pressure in a tire or similar article and which would also be capable of allowing the tire to be inflated during normal usage. As is known, tires eventually lose air and therefore pressure during normal use and must be refilled. In any event, it is desirable to measure the pressure in a tire on a continuous basis and furthermore, allow the tire to be filled in the event there is a decrease in pressure. It is understood that proper inflation and proper pressure prolongs the use of such tires as well as increases the performance.

It is an object of the present invention to provide a pressure transducer which will measure pressure in a tire or similar article while further allowing the tire to be inflated during normal use.

BRIEF DESCRIPTION OF THE FIGURES

FIG. 2 is a top plan view of the pressure transducer according to FIG. 1.

FIG. 3 is side cross-sectional view taken through lines 3-3 of FIG. 1.

FIG. 4 is a sectional view showing the plate and apertures employed in this invention.

FIG. 5 is a partial perspective view depicting a pressure transducer module according to this invention.

FIG. 6 is a schematic diagram of a pressure transducer including a wireless electronic interface employing a Wheatstone bridge.

FIG. 7 is schematic diagram of a wireless electronic interface and a pressure transducer employing a variable capacitance according to this invention.

FIG. 8 is a partial cross-sectional perspective view showing the various housings according to this invention.

DETAILED DESCRIPTION OF THE FIGURES

Figure 1:
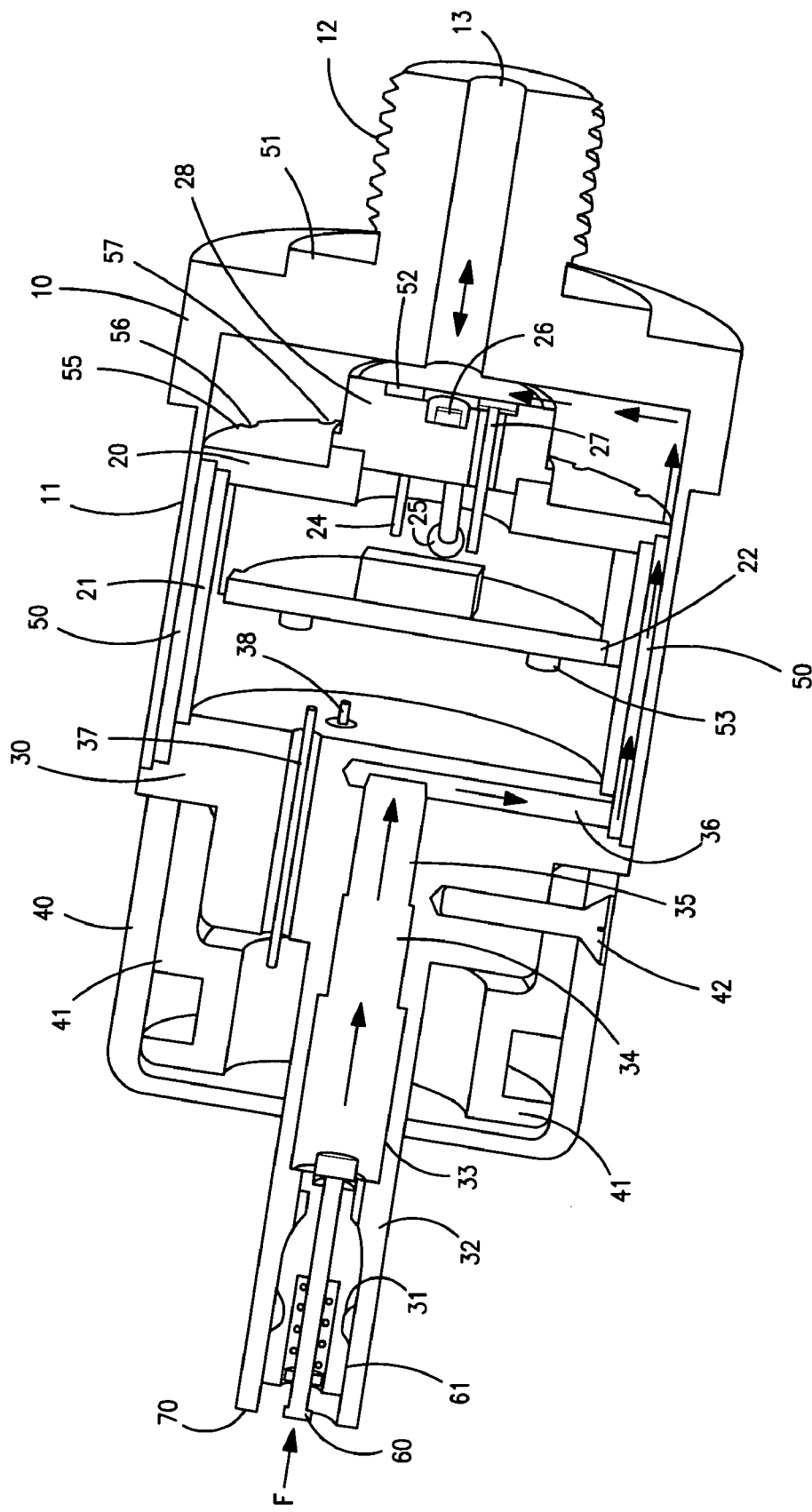
FIG. 1 is a perspective cross-sectional view of a pressure transducer according to this invention.

Referring to FIG. 1 there is shown a cross-sectional perspective view of a dual purpose pressure gage according to this invention. As in indicated above, the main use of the gage shown in FIG. 1 is to measure pressure in a tire such as an automobile, aircraft or other inflatable tire or device and to enable the addition of air or fluid when the pressure reaches a unacceptable or lower value. Thus referring to FIG. 1, the pressure device consists of three housing sections, mainly the front section 10, a section 20, which housing section 20 is enclosed within the hollow of housing section 10. Housing section 10 and 20 are secured to or welded to a third section 30. Attached to the third section 30 by means of a screw or other device 42 is an end section 40. End section 40 contains an antenna or other electronic device to enable utilization of the pressure device in a remote mode. As seen in FIG. 1, the front housing section 10 has an input pressure port 13 which is located on a threaded front section 12. The threaded front section 12 enables the device in FIG. 1 to be inserted into the valve of a tire, as for example, or otherwise to be inserted into a device to be monitored. In any event, the front section 10 has a thin-sleeved portion 11. The sleeved portion is part of the front section 10 and essentially it is a housing. As seen the sleeve as well as the front section 10, has an internal hollow. Inside the hollow is positioned the housing section 20. As seen, the section 20 has a diaphragm 52 which communicates with the pressure port 13. The diaphragm is associated with a pressure transducer 26. The pressure transducer 26 typically is a piezoresistive device and is oil-filled. Such transducers are well known in the art and many examples of oil-filled transducers are provided by the assignee herein. As seen, the transducer has an oil-fill tube 25, which enables one to fill the pressure sensor 26 with oil. There are also shown leads as 24 and 27 associated with the pressure sensor 26. The pressure sensor is contained within the housing 28, which housing 28 serves to correctly mount the pressure sensor into the aperture associated with housing 20. As seen leads of the pressure sensor as leads 24, 27 eventually are connected to a circuit board 22. The circuit board 22 has output terminals such as 53 which eventually will be connected. The electronics on the circuit board 22 are conventional and the terminals of the pressure sensor 26 are therefore connected to the appropriate terminals of the circuit board 22. As seen in FIG. 1, there is a space 50 between the sleeve 11 of housing 10 and the sleeve 21 of housing 20. This spacing enables air to flow past the housing 20 and into the pressure port 13. As can be seen, the housing 20 has secured to the front surface a plate 55. The plate 55, as will be further explained, has apertures such as 56 and 57 which apertures enable one to control the air flow as well as the air velocity into pressure port 13. The device or tire which is connected to pressure port 13 can be inflated while the pressure is also measured by the pressure sensor 26 and of course the electronics existing on circuit board 22. The electronics as well as pressure sensors, including piezoresistive pressure sensors having Wheatstone bridges to measure pressure are very well known. For an example of an oil-filled pressure transducer, reference is made to U.S. Pat. No. 4,406, 993 issued on Sep. 27, 1983 to A. D. Kurtz, the inventor herein, and assigned Kulite Semiconductor Products, Inc., the assignee herein, that patent shows an oil-filled pressure transducer which employs a semiconductor diaphragm and which includes a piezoresistive bridge array. As indicated, such arrays are well known in the art and the assignee herein has many patents describing such arrays. In any event, the transducer in the above 993 patent describes an oil-filled pressure transducer. Thus as seen, the transducer 26 is positioned within front section 28 of the housing 20. As previously indicated, there is a third housing 30. The housing 30 basically has flanges, which flanges accept the outer sleeve 11 associated with housing 10 and the inner sleeve 21 associated with housing 20. The edges of both sleeves are inserted into slots of housing 30 and essentially are welded in position. In this manner, the housing 20 is separated from the housing 10 by the space 50. This space or gap 50 between the sleeves 11 and 21 allows for air to flow from the input 70, as will be explained, to the output port 13. The input port 70 is positioned in front of an elongated tube 32 which emanates from housing 30. The input opening, or input port 70, is associated with a inflating valve 31. The inflating valve 31 is a typical valve as found in conventional tires. Essentially, the inflating valve 31 has a moveable piston 60 which is retained in a close position by a spring 61. If a force F is exerted on the piston 60, the piston will move to the right, thereby allowing air or fluid associated with the force to enter the different diameter apertures 33, 34 and 35. The apertures are dimensioned to afford velocity control of the air allowed to enter via valve 31. The aperture section, or the end section 35, communicates directly with an air flow aperture 36. Aperture 36 communicates with the gap 50 or space between the sleeves 11 and 21, and therefore air flows about the periphery of the sleeve 21. The air passes through the slots as 56 and 57 of the plate 55, thereby enters the space between the diaphragm 52 and is directed into the output port 13 thus enabling inflation of the tire. Thus as one can see when the valve 31 is in the closed position, there is no fluid passageway from port 70 to port 13. However, when the valve 31 is operated in the open position, whereby the piston 60 is moved, then air flows from input port 70 to output port 13, thus inflating the tire. In the meantime, as one can see, the air path is shown by the arrows and essentially the pressure sensor 26 will measure the tire pressure at output port 13, both during inflation and during non-inflation. It is of course understood that one can inflate the tire, remove the pressure source, and get a very accurate reading of pressure as compared to the reading that might occur when the tire is being inflated.

Referring to FIG. 8, there is shown a perspective view, partial assembly view to show the housings 10, 20 and 30 and how the sleeves as the outer sleeve 11 and inner sleeve 21 are interfaced with the housing section 30. As seen, these sleeves are welded to housing section 3. In this manner, the inner housing 20 can be hermetically sealed thus the internal cavity of the housing 20 which contains the electronic circuit board 22 as well as the electronics for the sensor 26 can be hermetically sealed. This completely protects the electronics and components from any deleterious substances which may be found in the source of air pressure applied to the input pressure port 70. This is extremely important as said sources of pressure may contain water vapor and other contaminants which may adversely affect the electronics and cause the failure of the unit depicted in FIG. 1. As seen in FIG. 8 the same reference numerals have been utilized to describe similar parts except that legends have been used in order to avoid the many reference numerals which would be required to completely describe the fabrication and construction of the device. It should be clear from FIG. 8 and FIG. 1 exactly how the device is used and how it is fabricated. Thus as described above, the device as shown in FIG. 1 and FIG. 8 is designed to be mounted into the valve of a tire so that the pressure can be accurately measured. In addition, the tire can be inflated via the input port 70 and this construction enables any air entering input port 70 through the valve 32 to circulate via gap 50 between the inner sleeve 21 and the outer sleeve 11, and therefore, go directly to the tire. The inflating valve as shown has an internal spring seal that allows high pressure to be introduced into the tire. When the desired high pressure is reached, the pressure source may be disconnected and the spring valve will seal insuring no leakage. As will be further explained, the device can be used either with actual output lead wires or with a wireless transmitter which is enclosed within the device. Thus again referring to FIG. 1, there is shown a section 40 which contains an antenna 41. The antenna 41 is of conventional construction and basically surrounds the inner surface of the housing 41. The antenna is connected to the electronics using leads as 37 and 38. Thus the antenna 41 will radiate a signal such as a Bluetooth signal to electronics associated with the vehicle and so on to obtain a remote reading of pressure. In a similar manner it is understood that leads such as 37 and 38 which are interfaced with the electronics on circuit board 22 can be directly brought out from the housing section 40 and therefore be hardwired. It is also noted that while a oil-filled transducer 26 is shown, one can utilize other types of pressure sensing devices such as a variable capacitors in conjunction with fixed inductors and so on. In this manner, the assignee has patents which show variable capacitor devices. See for example U.S. Pat. No. 4,814,845 entitled "Capacitive Transducers Employing High Conductivity Diffused Regions" issued on Mar. 21, 1989 to A. D. Kurtz and assigned to Kulite Semiconductor Products, Inc., the assignee herein. That patent shows a semiconductor capacitive transducer which will vary capacitance upon application of a force thereto.

Referring to FIG. 2 there is shown a front plan view of the transducer depicted in FIG. 1. As seen the device is basically circular having a front hex nut 51 to enable one to insert or remove the device by means of a hex wrench. The output pressure port 13 is shown as well as the housing 10 and the front portion 12.

FIG. 3 is a cross-sectional view taken through line 3-3 of FIG. 2. Essentially the same reference numerals have been used to note the various components. As seen in FIG. 3, the diaphragm associated with the sensor 26 is shown as flush against the top surface of the sensor therefore showing a space to allow the airflow from the input port 70 to the output port 13. The output port 13 as indicated would be connected directly to a tire or tire valve so that the pressure of the tire can be measured. Also FIG. 3 shows leads which are directed from the sensor assembly to the electronic circuit board 22 and which are both associated with housing section 20. It is again noted that housing section 20 is hermetically sealed and thus the electronics as well as the leads associated with the transducer and electronics are hermetically sealed and therefore contamination cannot occur. Again, FIG. 3 clearly depicts the air flow when the valve 32 is operated in the open position and as indicated, the air flows through the apertures 33, 34 and 35 into aperture 36 which then enables the air to flow about the inner housing 20, which inner house is contained within the hollow of the housing 10. The space between the sleeve 11 and sleeve 21 is designated by reference numeral 50 and that space allows air to flow about the inner housing section 20 and through the apertures as 56 and 57 of plate 55.

FIG. 4 and FIG. 5 shows the plate 55 front view as well as the outer sleeve 11 for a clearer understanding of the construction of the device.

Referring to FIG. 6, there is shown a typical Wheatstone bridge 50 which consists of 4 resistors 151, 152, 153 and 154. It is shown that the Wheatstone bridge is coupled to a wireless electronic interface 156 which is coupled to an antenna 157. The bias to the bridge can normally be supplied by a battery or the bias can be supplied by an RF (radio frequency) signal. The RF signal which is received by antenna 41 of the pressure device will be rectified to produce a DC voltage which can be used to bias the Wheatstone bridge array. Such techniques are well known and reference is made to U.S. Pat. No. 7,283,922 issued Oct. 16, 2007, entitled "Transducer Employing Wireless Transmission Through Sending and Receiving Signals" by A. D. Kurtz, et. al., and assigned to the assignee Kulite Semiconductor Products, Inc. In that patent the transducer is implemented to operate with transmitted frequency signals. These transmitted signals provide a bias for the transducer and enable the transducer to transmit a transducer output signal to a remote location. The entire content of that patent is incorporated herein and FIG. 6 shows a typical wireless transmission system as is, for example, described in the above noted patent. It is indicated that depending on how the pressure transducer is utilized, then it may be desirable to have the signals transmitted without the use of wires. It is understood that the transducer, or as the Wheatstone bridge, can be wired directly into corresponding monitoring equipment to determine the pressure of the tire or other device being monitored. While the device is described for use in aircraft tires, it can be employed with any type of tire, including automobile tires, bicycle tires, etc. The pressure in an automobile tire is at least ten times less than the pressure in an aircraft tire and, therefore, a device fabricated for use in the automotive industry would be smaller than a device utilized in the aircraft industry. As one will ascertain, the pressure transducer can enable the monitoring of pressure in any pressurized container, including tires or other types of containers such as inflatable mattresses. The pressure, while being continuously monitored, can also be maintained through the transducer, which has a selectively actuated input valve, and therefore, air or any other pressure medium, can be added without disturbing or affecting transducer operation. The transducer and the electronic components are hermetically sealed and, therefore, hermetically isolated from the air input source by means of the dual housings employed in this device.

Referring to FIG. 7 there is shown an oscillator 166 which basically includes a capacitor 169 which varies with the applied pressure or force. Such capacitors are well known in the art and references made to the above noted 845 patent which describes capacitors which can be employed. In any event the configuration shown in FIG. 7 is also a wireless configuration which is connected to wireless electronic interface 170 and to an output antenna 171 which is equivalent to antenna 157 of FIG. 6. In any event, the oscillator 166 is of conventional design and may be a Hartley or Colpitts Oscillator. The oscillator is also biased by an RF signal which is received by the antenna 171 and which is rectified in module 165 and therefore supplies operating power to the oscillator which enables the output frequency of the oscillator to be transmitted to a remote location. The output frequency will vary according to the value of the capacitor which frequency will be proportional to the pressure monitored.

We claim:

1. A pressure transducer comprising a first housing having an internal hollow and having a front surface and a back surface, a pressure port in said front surface communicating with said hollow, an inflating valve positioned on said back surface and communicating with said hollow, said valve operable in a first normally closed position and in a second operative opened position which operates to open said valve when a source of pressurized fluid is applied to said valve, a second housing, having a hollow and positioned in said hollow of said first housing and having a front surface communicating with said pressure port and a back surface communicating with said valve, said second housing supported within said hollow to provide a fluid passageway from said valve to said pressure port to enable a fluid to flow from said valve to said pressure port when said valve is operated in said second position, said second housing having a pressure sensing device on said front surface and operative to provide an output indicative of a pressure at said pressure port.

2. The pressure transducer, according to claim 1, wherein said second housing is supported within said hollow of said first housing by means including a plate with spaced flanges with the space between said flanges creating slots to enable a fluid flow.

3. The pressure transducer, according to claim 1, wherein said second housing is hermetically sealed.

4. The pressure transducer, according to claim 1, wherein said pressure sensing device is a semiconductor pressure sensor having a deflectable diaphragm on said front surface and having at least one piezoresistive sensor on said diaphragm operative to change resistance according to a pressure applied to said pressure port.

5. The pressure transducer, according to claim 4, wherein said semiconductor pressure sensor is a Wheatstone bridge.

6. The pressure transducer, according to claim 5, further including wireless interface means coupled to said bridge to transmit a signal indicative of the pressure applied to said pressure port.

7. The pressure transducer, according to claim 1, wherein said pressurized fluid is air.

8. The pressure transducer, according to claim 7, wherein said pressure applied to said pressure port is the pressure from a tire.

9. The pressure transducer, according to claim 1, further including a circuit board located in the hollow of said second housing coupled to said pressure sensing device.

10. The pressure transducer, according to claim 1, including means coupled to said pressure sensing device to apply an operating potential thereto.

11. The pressure transducer, according to claim 2, wherein said pressure sensing device includes a capacitor having a capacitance varying with an applied pressure.

12. The pressure transducer, according to claim 11, further including an inductor coupled to said capacitor to form a tuned circuit whose frequency varies with an applied pressure.

13. The pressure transducer, according to claim 12, including an oscillator coupled to such tuned circuit and providing an output frequency according to an applied pressure.

14. The pressure transducer, according to claim 4, wherein said semiconductor pressure sensor is oil-filled.

15. The pressure transducer, according to claim 2, wherein said means further includes a third housing coupled to said first and second housing to position said first and second housing so a gap or fluid passageway is provided.

\* \* \* \* \*